(12) United States Patent
Heinen et al.

(10) Patent No.: US 6,904,019 B2
(45) Date of Patent: Jun. 7, 2005

(54) IDENTIFYING A PATTERN IN A DATA STREAM

(75) Inventors: Martin Heinen, Bondorf (DE); Guenther Tietz, Leinfelden-Echterdingen (DE); Thomas Burger, Gerstetten-Gussenstadt (DE)

(73) Assignee: Agilent Technologies, Inc., Palo Alto, CA (US)

( * ) Notice: Subject to any disclaimer, the term of this patent is extended or adjusted under 35 U.S.C. 154(b) by 758 days.

(21) Appl. No.: 09/834,830

(22) Filed: Apr. 13, 2001

(65) Prior Publication Data

US 2002/0150127 A1 Oct. 17, 2002

(51) Int. Cl.$^7$ .............................................. H04L 12/26
(52) U.S. Cl. ...................................... 370/244; 370/250
(58) Field of Search ................................ 370/244, 250, 370/366, 535, 536, 542, 514, 507, 510, 518, 511, 512; 341/100, 142, 143, 173, 174, 180; 702/125; 375/368

(56) References Cited

U.S. PATENT DOCUMENTS

| | | | | |
|---|---|---|---|---|
| 4,712,209 A | * | 12/1987 | Kuritani et al. | 370/241 |
| 6,125,104 A | * | 9/2000 | Shiragaki et al. | 370/216 |
| 6,167,077 A | * | 12/2000 | Ducaroir et al. | 375/219 |
| 6,288,656 B1 | * | 9/2001 | Desai | 341/100 |
| 6,594,275 B1 | * | 7/2003 | Schneider | 370/465 |
| 6,628,621 B1 | * | 9/2003 | Appleton et al. | 370/249 |
| 6,650,140 B2 | * | 11/2003 | Lee et al. | 326/39 |
| 6,658,363 B2 | * | 12/2003 | Mejia et al. | 702/125 |
| 6,680,970 B1 | * | 1/2004 | Mejia | 375/225 |

* cited by examiner

Primary Examiner—Wellington Chan
Assistant Examiner—Mark A Mais

(57) ABSTRACT

For identifying or localizing a serial data stream in a deserialized output provided at a plurality of n output ports (PORT1–PORT5), a pattern recognition is provided at each one of the plurality of n output ports (PORT1–PORT5) for recognizing a deserialized identifier pattern corresponding to an identifier pattern within the serial data stream and for detecting a phase of the deserialized identifier pattern in the deserialized output. The phase of the output of each respective port (PORT1–PORT5) is then shifted in correspondence with the detected phase of the deserialized identifier pattern.

12 Claims, 2 Drawing Sheets

IDENTIFYING A PATTERN IN A DATA STREAM

BACKGROUND OF THE INVENTION

The present invention relates to testing multiplexing devices.

Testing multiplexing devices, i.e. devices with a plurality of ports (inputs/outputs) on one side and one port (output/input) on the other side, has become increasingly important.

A typical application for such multiplexing devices is a serializer receiving a plurality of parallel data ports and providing therefrom a serialized data stream on one output port. In a sequential and circular manner, the serializer addresses each one of the parallel input ports and provides a portion of the applied data signal of that input port as output to the serialized output port. Thus, parallel data streams can be converted into a serial data stream, whereby typically the data transmission rate at the serialized output of a serializer with n parallel input ports is n-times the data transmission speed of each parallel input port.

Another important application of multiplexing devices are deserializers working in the opposite direction as serializers, so that a serial input stream is deserialized, i.e. converted into a parallel output stream.

Serializer/Deserializer-Devices (SerDes) allow serial/parallel data stream conversion in either way.

In its deserializing mode, multiplexing devices are typically tested by providing a known serial data stream and comparing the received deserialized data pattern at the parallel side with an expected deserialized data pattern. However, for safely comparing actually received with expected data pattern, it is essential to clearly identify data pattern corresponding to the applied data pattern in the received data stream.

SUMMARY OF THE INVENTION

It is an object of the present invention to provide an improved testing of multiplexing devices in their deserializing mode. The object is solved by the independent claims. Preferred embodiments are shown by the dependent claims.

The present invention allows testing a multiplexing device adapted for receiving a serial data stream at an input port and providing a deserialized output at a plurality of n output ports. For testing the multiplexing device, a known serial data sequence is applied to its input port, and the actually received deserialized output at the output ports is compared with an expected output signal. Deviations of the actually received output signal from the expected output signal may indicate a malfunctioning of the multiplexing device.

In order to synchronize the received with the expected output data pattern, the invention provides a pattern recognition on the deserialized output signal and, when the pattern has been detected, a phase shifting of the received output patterns in correspondence with a detected phase of the detected pattern. Thus, the invention allows to identify the provided serial input data into the deserialized output, so that such actually received output pattern can be compared with expected output pattern that are also expected to correspond to each other. Erroneous interpretations of the applied testing, e.g. due to a phase shift between the received and the expected data patterns can thus be reduced or even be avoided.

In a preferred embodiment, a data pattern within the deserialized output corresponding to a known data pattern provided at the serial input of the multiplexing device is identified by detecting an identifier in one of the parallel outputs and providing a phase shift of the received data pattern in the other output ports in correspondence with the detected identifier. Preferably, a starting sequence of the applied data sequence to be identified in the deserialized output can serve as such identifier.

In a preferred embodiment, k data bits (e.g. the first k data bits) of a serial data sequence to be identified in the deserialized output serve as identifier pattern. The k serial data bits are converted into a deserialized identifier pattern. Preferably, the deserialized identifier pattern represents the first data bit, the data bit number (n+1), the data bit number (2n+1), . . . , and the data bit number (2i+1) of the serial identifier pattern, whereby n is the number of output ports and $(2i+1) \neq k$ or, in other words, $i \neq (k-1)/2$ with i as an integer value.

The deserialized identifier pattern is applied to each of the output ports, and pattern recognition of the received output with the deserialized identifier pattern is provided for each one of the output ports. When the deserialized identifier pattern is detected in one of the output ports, the identifier pattern is assumed to have been identified. The phase of each one of the other output ports has to be adjusted to the phase of the output port where the deserialized identifier pattern has been detected. Thus, the serial input pattern can be identified within the deserialized output, and a meaningful testing (e.g. by comparing the received with an expected output) can be provided.

The identifier pattern preferably represents the first valid data bits of a data stream. However, any other identifier pattern can be provided accordingly. In particular, the identifier might represent a data portion independent of the serial data input that is only provided for synchronizing the parallel with the serial data stream.

The invention can be partly or entirely embodied or supported by one or more suitable software programs, which can be stored on or otherwise provided by any kind of data carrier, and which might be executed in or by any suitable data processing unit. In particular, software tools can be applied e.g. for providing the deserialized identifier pattern, for programming synchronization hardware or sequencers, and for distributing the expected data pattern.

Hardware tools are preferably applied for aligning the phases to the detected deserialized identifier pattern. In particular for providing acceptable execution time, real time processing might require hardware solutions e.g. avoiding that large memories must be reloaded while a measurement is in progress.

BRIEF DESCRIPTION OF THE DRAWINGS

Other objects and many of the attendant advantages of the present invention will be readily appreciated and become better understood by reference to the following detailed description when considering in connection with the accompanied drawing.

DETAILED DESCRIPTION OF THE INVENTION

Figure 1:
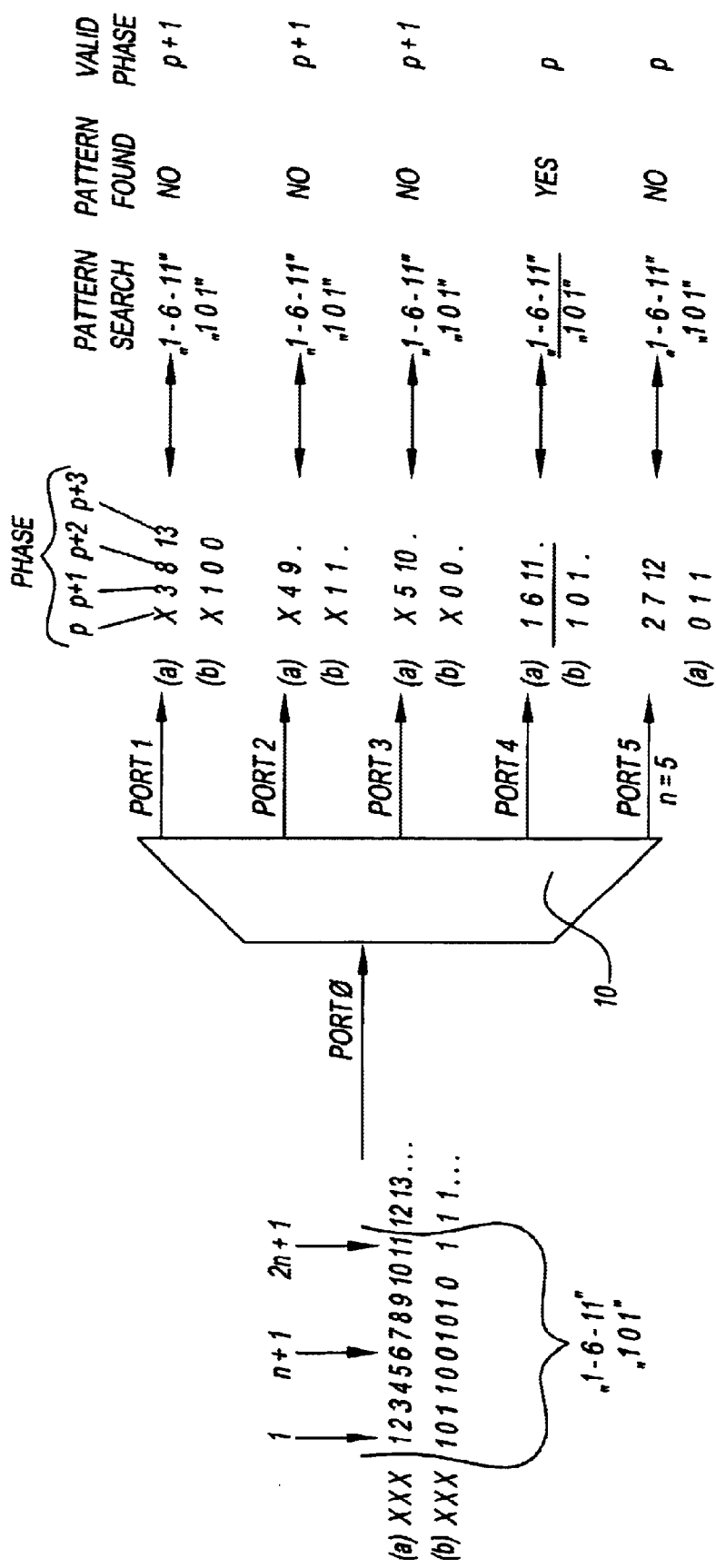
FIG. 1 illustrates the invention in an example with a demultiplexer 10.

In FIG. 1, a demultiplexer 10 receives a serial data stream at its input port PORT0 and provides therefrom a deserialized output at its output ports PORT1 to PORT5.

In the example of FIG. 1, PORT0 receives a data stream denoted as (a) or (b), whereby non-valid bits are denoted as "X". In data stream (a) valid bits are numbered by its position, so that "1" denotes the first valid bit, "2" denotes the second valid bit, "3" denotes the third valid bit, etc. Data stream (b) gives an example of a digital bit stream with valid bits either being a logical "1" or "0". Both bit streams (a) and (b) are provided for the sake of better understanding.

In operation, the demultiplexer 10 deserializes the serial input data stream at PORT0 to a parallel data stream at its output ports PORT1 to PORT5. Using the notation of data stream (a), PORT1 thus outputs a bit sequence of the positions "X-3-8-13", PORT2 outputs bit positions "X-4-9", and so on. Using the notation of data stream (b), PORT1 outputs a data stream "X101", PORT2 outputs "X11", and so on.

In order to synchronize the output of demultiplexer 10 with the data stream provided to its input PORT0 or, in other words, in order to identify a valid data stream provided to the input of PORT0 in the parallel output of PORT1 to PORT5 the starting bit sequence with bit positions 1 to 11 in (a) is used as identifier. The seriaidentifier pattern of valid bit positions 1 to 11 is first deserialized, starting with bit position "1". This leads to the deserialized data pattern of bit positions "1-6-11" of (a) or data pattern "101" of (b).

A pattern search for the deserialized identifier pattern is then provided for each one of the output ports PORT1 to PORT5. In the example of FIG. 1, the deserialized identifier pattern is recognized at PORT4 starting with phase p of the parallel output. It is then assumed that the valid data stream starts at PORT4 with phase p. Accordingly, the valid phases of the other ports PORT1 to PORT3 and PORT5 have to be adjusted. For all ports greater than the port where the deserialized identifier pattern has been found, the same phase as the phase of the port where the deserialized identifier pattern has been found is assumed. For all other ports, the successive phase is assumed as the valid phase. In the example of FIG. 1 the valid phase of PORT5 is assumed to be the same phase p as for PORT4, while the valid phase for the ports PORT1 to PORT3 is assumed to be the successive phase (p+1).

In order to test the functionality of the demultiplexer 10, the received outputs at the ports PORT1 to PORT5 can then be compared with expected output patterns once the valid input pattern has been identified in the output pattern and the phases of the output pattern have been adjusted accordingly.

As apparent from the example of FIG. 1, the deserialized identifier pattern "101" will also be found on PORT1 starting with phase (p+1). It is therefore clear, that in order to reduce the likelihood of such ambiguities further measures might have to be taken. One possibility is to increase the number of bits in the deserialized identifier pattern. Another possibility could be to provide a pattern search with more than one deserialized identifier pattern, so that e.g. a second deserialized identifier pattern "2-7-12" (notation (a)) has to be found in the successive port, once the first deserialized identifier pattern "1-6-11" (notation (a)) has been found. A further possibility is to use a defined serial input stream with a defined repetition of patterns such as a pseudo random bit stream (PRBS). The length of the deserialized identifier pattern can then be adjusted to the defined serial input bit stream, so that valid repetitions of the deserialized identifier pattern in the output data stream is avoided for properly working devices to be tested.

To assure a correct pattern recognition and therefore synchronization, the pattern identifier (or so called detect word) is preferably provided with sufficient length (e.g. 48 bits) and additionally should be unique.

From the foregoing it has to become apparent, that a synchronization of the deserialized output to a valid data stream can only provided once the serialized identifier pattern has been detected. This, in the inverse, also allows identifying a fault in the demultiplexer 10 in case that the valid data sequence cannot be identified in the deserialized output (synchronization fails).

Figure 2:
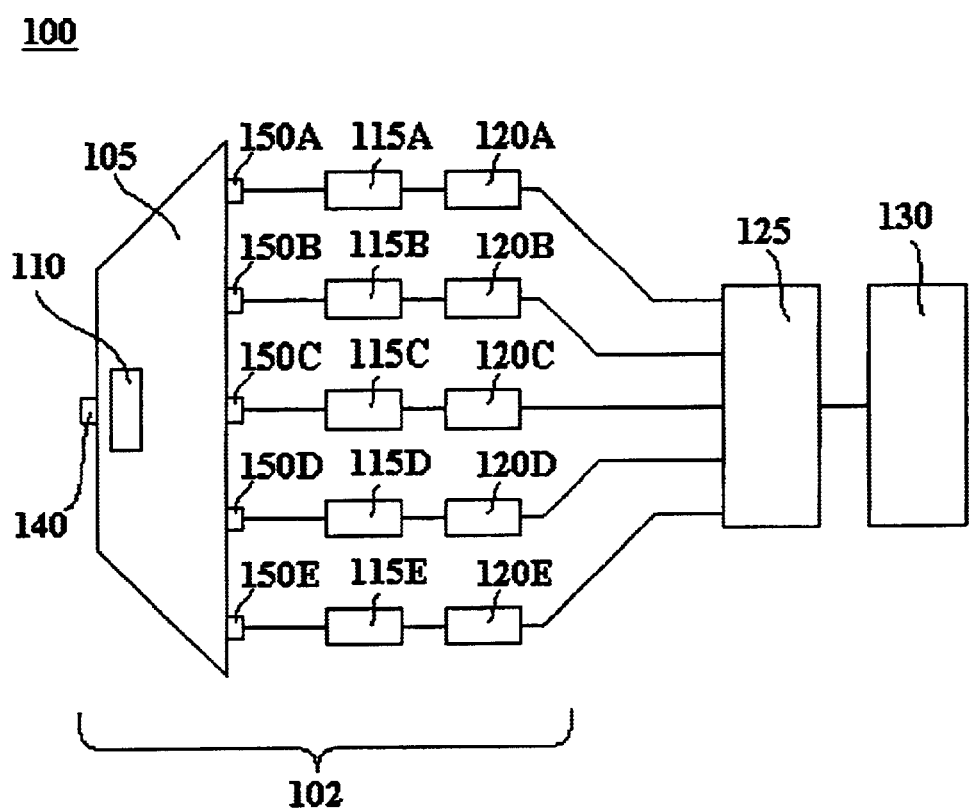
FIG. 2 is a block diagram of a testing unit.

FIG. 2 is a block diagram showing a testing unit 100 that includes a system 102, a comparator unit 125, and an analyzing unit 130. System 102 includes a multiplexing device 105, a deserializing unit 110, pattern recognition units 115A-E, and phase shifting units 120A-E.

Multiplexing device 105 receives a serial data stream at an input port 140. The serial data stream contains an identifier pattern. Deserializing unit 110 deserializes the identifier pattern and produces a deserialized identifier pattern. Multiplexing device 105 provides, at output ports 150A-E, a deserialized output that contains the deserialized identifier pattern. Pattern recognition units 115A-E are coupled to each one of the plurality of output ports 150A-E, recognize the deserialized identifier pattern corresponding to the identifier pattern within the serial data stream, and detect a phase of the deserialized identifier pattern. Phase shifting units 120A-E are coupled to each one of the plurality of output ports 150A-E and shift the phase of the output of each respective port 150A-E in correspondence with the detected phase of the deserialized identifier pattern. Comparator unit 125 compares the deserialized output corresponding to the known serial data sequence with an expected output signal. Analyzing unit 130 analyzes deviations of the deserialized output corresponding to the known serial data sequence with the expected output signal.

What is claimed is:

1. A system for at least one of identifying or localizing a serial data stream in a deserialized output, wherein the serial data stream is applied to an input port of a multiplexing device and the deserialized output is provided at a plurality of n output ports of the multiplexing device, the system comprising:

pattern recognition units coupled to each one of the plurality of n output ports and being adapted for recognizing a deserialized identifier pattern corresponding to an identifier pattern within the serial data stream and for detecting a phase of the deserialized identifier pattern in the deserialized output; and phase shifting units coupled to each one of the plurality of n output ports and being adapted for shifting the phase of the output of each respective port in correspondence with the detected phase of the deserialized identifier pattern.

2. The system of claim 1, further comprising a deserializing unit for deserializing the identifier pattern within the serial data stream to produce the deserialized identifier pattern.

3. A testing unit for testing a multiplexing device adapted for receiving a serial data stream at an input port and for providing a deserialized output at a plurality of n output ports, wherein a known serial data sequence is applied to the input port, the testing unit comprising:

a detecting system for detecting the known serial data sequence in the deserialized output, wherein the serial data stream is applied to an input port of a multiplexing device and the deserialized output is provided at a plurality of n output ports of the multiplexing device, the detecting system comprising:

pattern recognition units coupled to each one of the plurality of n output ports and being adapted for recognizing a deserialized identifier pattern corresponding to an identifier pattern within the serial data stream and for detecting a phase of the deserialized identifier pattern in the deserialized output; and phase shifting units coupled to each one of the plurality of n output ports and being adapted for shifting the phase of the output of each respective port in correspondence with the detected phase of the deserialized identifier pattern;

a comparator unit for comparing the deserialized output corresponding to the known serial data sequence with an expected output signal; and an analyzing unit for analyzing deviations of the deserialized output corresponding to the known serial data sequence with the expected output signal.

4. A method for at least one of identifying or localizing a serial data stream in a deserialized output provided at a plurality of n output ports, the method comprising:

providing a pattern recognition at each one of the plurality of n output ports for recognizing a deserialized identifier pattern corresponding to an identifier pattern within the serial data stream and for detecting a phase of the deserialized identifier pattern in the deserialized output; and shifting the phase of the output of each respective port in correspondence with the detected phase of the deserialized identifier pattern.

5. The method of claim 4, further comprising first deserializing the identifier pattern within the serial data stream to produce the deserialized identifier pattern.

6. A method for testing a multiplexing device adapted for receiving a serial data stream at an input port and for providing a deserialized output at a plurality of n output ports, the method comprising:

applying a known serial data sequence to the input port;

detecting the known serial data sequence in the deserialized output by:

providing a pattern recognition at each one of the plurality of n output ports for recognizing a deserialized identifier pattern corresponding to an identifier pattern within the serial data stream and for detecting a phase of the deserialized identifier pattern in the deserialized output, and shifting the phase of the output of each respective port in correspondence with the detected phase of the deserialized identifier pattern;

comparing the deserialized output corresponding to the known serial data sequence with an expected output signal; and analyzing deviations of the deserialized output corresponding to the known serial data sequence with the expected output signal.

7. A software program stored on a data carrier, for executing the method of claim 4 when run on a data processing system.

8. A system for synchronizing a deserialized output with a serial data stream, wherein the serial data stream is applied to an input port of a multiplexing device and the deserialized output is provided at a plurality of n output ports of the multiplexing device, the system comprising:

pattern recognition units coupled to each one of the plurality of n output ports and being adapted for recognizing a deserialized identifier pattern corresponding to an identifier pattern within the serial data stream and for detecting a phase of the deserialized identifier pattern in the deserialized output; and phase shifting units coupled to each one of the plurality of n output ports and being adapted for shifting the phase of the output of each respective port in correspondence with the detected phase of the deserialized identifier pattern.

9. The system of claim 8, further comprising a deserializing unit for deserializing the identifier pattern within the serial data stream to produce the deserialized identifier pattern.

10. A method for synchronizing a deserialized output with a serial data stream, the method comprising:

providing a pattern recognition at each one of the plurality of n output ports for recognizing a deserialized identifier pattern corresponding to an identifier pattern within the serial data stream and for detecting a phase of the deserialized identifier pattern in the deserialized output; and shifting the phase of the output of each respective port in correspondence with the detected phase of the deserialized identifier pattern.

11. The method of claim 10, further comprising first deserializing the identifier pattern within the serial data stream to produce the deserialized identifier pattern.

12. A software program stored on a data carrier, for executing the method of claim 6 when run on a data processing system.

* * * * *